United States Patent
Aerts et al.

[11] Patent Number: 5,952,452
[45] Date of Patent: Sep. 14, 1999

[54] HYDROXY-FUNCTIONAL OLIGOMERS FOR HIGH SOLIDS COATINGS

[75] Inventors: Armand Aerts, Bekkevoort; Anne DeMarre, Ghent; Jozef Huybrechts, Oud-Turnhout, all of Belgium; G. Todd Palmer, Wilmington, Del.

[73] Assignee: E. I. du Pont de Nemours and Company, Wilmington, Del.

[21] Appl. No.: 08/895,292

[22] Filed: Jul. 16, 1997

[51] Int. Cl.$^6$ .............................. C08G 63/20; C08G 63/42
[52] U.S. Cl. ..................... 528/297; 528/366; 560/199; 560/200
[58] Field of Search ................... 528/297, 366; 560/199, 200

[56] References Cited

U.S. PATENT DOCUMENTS 4,113,702  9/1978  Psencik ................................. 528/297

FOREIGN PATENT DOCUMENTS

| | | |
|---|---|---|
| 32 44004 A1 | 5/1984 | Germany . |
| 01-011123 | 1/1989 | Japan . |
| 06/057204 | 3/1994 | Japan . |
| 1528802 | 10/1978 | United Kingdom . |
| WO 96/12754 | 5/1996 | WIPO . |
| WO 98 23661 | 6/1998 | WIPO . |

OTHER PUBLICATIONS

Vegter G C et al. Ueber Den Effekt Der Einarbeitung von Diolen in Alkydharze Auf Basis Verzweigter Carbonsaeuren Fette, Seifen, Anstrichmittel, vol. 68, No. 4, Apr. 1996, pp. 283–288.

*Primary Examiner*—Patricia A. Short
*Attorney, Agent, or Firm*—J. A. Costello; S. G. Deshmukh

[57] ABSTRACT

A high solids coating composition comprising a branched hydroxy-functional polyester oligomer and a curing agent; and the oligomer itself containing at least 20% by weight of the binder of at least one of the following tertiary acid ester end groups:

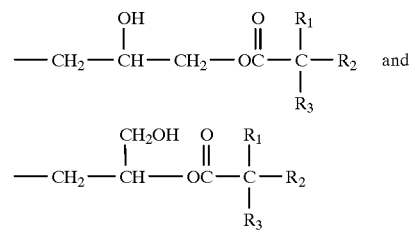

where $R_1$, $R_2$ and $R_3$ are independently selected from $CH_3$ and $CH_2OH$; the composition being suitable as an automobile clearcoat or pigmented topcoat.

4 Claims, No Drawings

HYDROXY-FUNCTIONAL OLIGOMERS FOR HIGH SOLIDS COATINGS

BACKGROUND OF THE INVENTION

This invention relates to polyester oligomers and polyester polyol-based coating compositions cured with a conventional crosslinker.

Due to legislation in Europe and the United States, coatings industries are under pressure to reduce volatile organic compounds (VOC) in coatings formulations. Therefore, coating compositions are needed which have good physical properties and appearance, but which are inherently low in viscosity and require minimal dilution with solvents. The use of branched hydroxy-functional polyester derivatives prepared by ring-opening with narrow molecular weight distribution and accordingly low viscosity, in coatings, has been described in British Patent 1,528,802, However, application of these polyester oligomers in, say, automotive coatings require the presence of high Tg acrylic polyols to get enough physical drying of the coating film. The present invention allows low-viscosity, low-VOC coatings based on narrow molecular weight distributed polyester polyols containing tertiary acid ester groups, the coatings having sufficiently high Tg for good drying characteristics, physical properties and appearance.

SUMMARY OF THE INVENTION

This invention concerns a low VOC, preferably below about 450 grams per liter, thermoset coating composition comprising a binder which is a branched hydroxy-functional polyester polyol, and a curing agent. The polyester polyol contains this tertiary acid ester group:

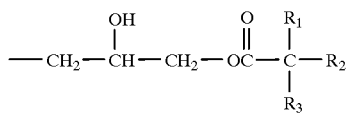

and/or

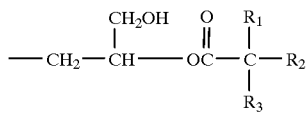

wherein $R_1$, $R_2$ and $R_3$ are independently selected from $CH_3$ and $CH_2OH$; the polyol oligomer having a weight average molecular weight of 400 to 4000 and a hydroxyl number of 100 to 400 (mg KOH/g solid).

Suitably, the curing agent comprises an alkylated melamine formaldehyde compound and/or a blocked (poly) isocyanate compound in a one-package system, or polyisocyanate compound in a two-package system, or other crosslinking agents such as silanes, urea formaldehyde adducts and the like, which react with the functional groups present in the polyester polyol.

The invention is directed to a coating composition comprising:

(a) about 40 to 90 percent by weight of the composition, of
 (i) a hydroxy-functional polyester oligomer having a weight average molecular weight of about 400 to 4000 and a hydroxyl number of 100 to 400, containing at least 20%, by weight of the binder, of a tertiary acid ester end group:

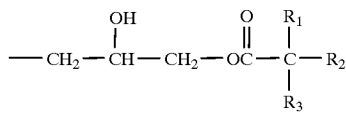

and/or

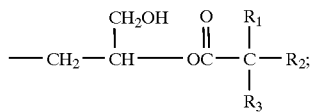

reacted with
 (ii) a crosslinking agent; the ratio of (i) to (ii) being about 2:5 to 49: 1; and
(b) about 10 to 60 percent by weight of the composition of at least one member selected from the group of solvents, pigments, extenders and additives.

In general, the total of polymeric and oligomeric components of a coating composition are referred to as the "binder" or "binder solids", and are dissolved, emulsified or otherwise dispersed into a liquid carrier. The binder solids generally include all normally solid polymeric compounds of the composition. Catalysts, pigments and chemical additives such as stabilizers are not considered part of the binder solids. The coating composition of the present invention suitably contains about 30% to 90%, more typically 50% to 85%, by weight of the binder, and about 10% to 70%, more typically 15% to 50% by weight of the composition of an organic solvent carrier, pigments, extenders and other additives.

The process for preparing the binder (a) comprises reacting A (i) and A (ii) or B (i) and B (ii) or combining a mixture thereof as follows:

(A) (i) 10% to 65%, preferably 30% to 60%, by weight of the binder of a polycarboxylic acid or a mixture of polycarboxylic acids, having a weight average molecular weight of 100 to 1500, and an acid value of 100 to 800 (mg KOH/g solid), preferably 250 to 700, and
 (ii) 90% to 35%, preferably 70% to 40%, by weight of the binder, of a tertiary acid glycidyl ester, preferably pivalic acid glycidyl ester; and/or
(B) (i) 20% to 80%, preferably 50% to 80%, by weight of the binder of a poly-glycidyl ester derivative reaction product of polycarboxylic acid as described above with epichlorohydrin, having a weight average molecular weight of about 200 to 2000 and an epoxy equivalent weight of 100 to 400, preferably from 140 to 300; and
 (ii) 80% to 20% preferably 50% to 20%, based on weight of the binder of a tertiary acid derivative, preferably pivalic acid, dimethylolpropionic acid, hydroxy pivalic acid or a blend of those.

The present composition is useful for finishing the exterior of automobiles and trucks and parts thereof. Depending on the presence of pigments and other conventional compounds, the described composition can be used as a colored topcoat and or clearcoat. The invention also includes a process for coating a substrate with the above coating composition. The invention further includes a substrate having adhered thereto a coating composition of the invention.

DETAILED DESCRIPTION

In the synthesis of the polycarboxylic acids, typical mono and polyacids and/or anhydrides are reacted with polyols. Examples of suitable polyacids are: 1,4- cyclohexanedicarboxylic acid (CHDA) hexahydrophtalic acid, methyl-hexahydrophthalic acid, methyl-hexahydrophthalic acid, phthalic acid, isophtalic acid, trimellitic acid, adipic acid, azelaic acid, dodecanedioc acid, and the like, and mixtures thereof. Moreover, polycarboxylic acid compounds can be obtained as the reaction product of a polyhydric alcohol and an acid anhydride. Examples of those polyhydric alcohols are: trimethylolpropane (TMP), ditrimethylolpropane, monopentaerythritol (MPE), di-pentaerythritol, ethylene glycol, diethylene glycol, glycerol, trimethyl pentanediol, cyclohexane diol, cyclohexane dimethanol, 1,6,-hexane diol, neopentyglycol, 2,2-butylethylpropane diol, and the like, and mixtures thereof. Examples of suitable acid anhydrides are: hexahydropthtalic anhydride (HHPA), methyl hexahydrophtalic anhydride (MHHPA), phthalic anhydride, trimellitic anhydride, and the like, and mixtures thereof.

A preferred way of preparing a polyacid is the ring-opening polycondensation of a polyol with an anhydride and or acid anhydride. The ring-opening polycondensation of the polyol and the acid anhydride is carried out by techniques known to those skilled in the art. Generally, the reaction can be conducted by combining the polyol and the anhydride, and heating to a temperature of 100° to 170° C., and hold the reaction mixture at that temperature until the theoretical acid number is reached. Preferred compositions are the adducts of TMP and/or MPE with HHPA and/or MHHPA. To obtain the polyester polyol described in the present invention, the described polycarboxylic acid compounds can be reacted with a tertiary acid glycidyl ester, preferably pivalic acid glycidyl ester. The reaction is carried out by combining the reactants and heating at 100° to 170° C., and holding the reaction mixture at that temperature until full conversion of acid and epoxy groups, determined by acid number of epoxy groups using standard titration methods. The hydroxy-functional polyester oligomer can also be obtained using a second synthesis procedure in which a poly-glycidyl ester compound is reacted with a tertiary acid derivative. The epoxy-ester containing compound can be obtained by epoxidation of the above-mentioned polycarboxylic acid derivatives. Examples of epoxy-ester derivatives are hexahydrophthalic acid di-glycidyl ester, trimellitic acid tri-glycidyl ester, polyglycidyl ester of the adducts of TMP and/or MPE with HHPA and/or MHHPA, or mixtures thereof.

In an alternative reaction procedure, the epoxy-ester containing compounds can be reacted with tertiary acid components to yield the described hydroxy-functional polyester derivatives. Examples of the tertiary acid components are pivalic acid, dimethylol propionic acid, hydroxy-pivalic acid.

A catalyst can be used to accelerate ring-opening esterification reactions. Usually employed are: organotin catalysts such as dibutyltindilaurate, dibutyltinoxide, tinoctoate, and the like; tri-substituted amines such as triethylamine, dimethyl benzylamine, dimethyl ethanolamine, triethanolamine and the like; tertiary amine salts such as benzyltrimethylammonium hydroxide, tetrabutylammonium iodide and the like; phosphonium-containing catalysts such as ethyltriphenylphosphonium iodide, ethyltriphenylphosphonium bromide and the like.

The catalyst is optional, and if used, the amount added can vary widely. When used, the amount typically ranges from about 0.01 to 1 weight percent, based on binder solids.

The described binder systems are utilized to produce coatings by blending with other suitable components in accordance with normal paint formulating techniques. The hydroxy-functional polyester oligomers of the present invention are useful as film-forming vehicles in preparation of solvent-based coatings.

Auxiliary polymers can be introduced in the coating composition as, for example, pigment dispersants, flow additives, rheology control additives, and the like. An organic solvent is also typically utilized, preferably in minimal amounts, to facilitate formulation and application of the coating compositions of the present invention. An organic solvent is utilized which is compatible with the components of the composition. The amounts of polyester polyol, curing agent, and catalyst will, of course, vary widely depending upon many factors, among them the specific components of the composition and the intended use of the composition. In addition, the composition can contain a variety of other optional ingredients, including pigments, pearlescent flakes, fillers, plasticizers, antioxidants, surfactants, and flow control agents.

To improve weatherability of a finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers and specific hindered amine light stabilizers. Also, an antioxidant can be added, in the amount of 0.1–5% by weight, based on the weight of the binder. Typical ultraviolet light stabilizers include benzophenones, triazoles, triazines, benzoates, hindered amines and mixtures thereof. The composition can also include conventional formulation additives such as flow Control agents, for example, Resiflow\® S (polybutylacrylate), BYK® 320 and 325 (high molecular weight polyacrylates); rheology control agents, such as fumed silica, microgels, and non-aqueous dispersion polymers, water-scavengers such as trimethyl orthoformate, triethyl orthoformate, and the like.

When the present composition is used as a clearcoat (topcoat) over a pigmented colorcoat (basecoat) to provide a colorcoat/clearcoat finish, small amounts of pigment can be added to the clearcoat to provide special color or aesthetic effects such as tinting. The present composition can be pigmented and used as the colorcoat, monocoat, primer, or primer-surfacer. The composition has excellent adhesion to a variety of metallic or non-metallic substrates, such as previously painted substrates, cold-rolled steel, phosphatized steel, and steel coats with conventional primers by elecrodeposition. The present composition can be used to coat plastic substrates such as polester-reinforced fiberglass, reaction injection-molded urethanes and partially crystalline polyamides.

When the present coating composition is used as a colorcoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety or organic colored pigments such as quinacridones, copper phthalocyanines, perylenes, azo pigments, idanthrone blues, carbazoles such as carbazole violet, isoindolinones, isoindolones, thioindigo reds, benzimidazolinones, metallic flake pigments such as aluminum flake and the like. The pigments can be introduced into the coating composition by first forming a mill base or pigment dispersion with any of the polymers used in the coating composition or with another compatible polymer or dispersant by conventional techniques, such as high speed mixing, sand-grinding, ball-milling, attritor-grinding or two roll-milling. The mill base is then blended with the other constituents used in the coating composition to obtain the present coating compositions.

The coating composition can be applied by conventional techniques such as spraying, electrostatic spraying, dipping, brushing, flow-coating and the like. The preferred techniques are spraying and electrostatic spraying. The present composition can be used with ambient cure, especially for refinish, or at elevated temperature. In new car (OEM) applications, the composition is typically baked at 100° to 150° C. for about 15 to 30 minutes to form a coating about 0.1 to 3.0 mils thick. When the composition is used as a clearcoat, it is applied over the colorcoat which can be dried to a tack-free state and cured or flash-dried for a short period before the clearcoat is applied. The colorcoat/clearcoat finish is then baked to provide a dried and cured finish. It is customary to apply a clear topcoat over a basecoat by means of a "wet-on-wet" application which the topcoat is applied to the basecoat without curing or completely drying the basecoat. The coated substrate is then heated for a predetermined time period to allow simultaneous curing of the base and clear coats.

When preparing the coating compositions of the present invention, if the binder is used in a formulation that is cured with a curing agent containing N-methylol and/or N-methylol ether groups, the curing agent can be mixed with the binder to form a stable one-component paint formulation. Examples of such curing agents are amino resins obtained by reacting an aldehyde, such as formaldehyde, with a compound containing amino group such as melamine, urea and benzoguanamine and total or partial etherification of the N-methylol group with an alcohol such as methanol, n-butanol, isobutanol.

To form a composition which will crosslink under elevated baking temperatures of about 60° to 180° C. for about 5 to 60 minutes, about 10% to 60%, preferably 10% to 25% by weight, based on the weight of the binder, of an alkylated melamine formaldehyde crosslinking agent having 1 to 4 carbon atoms on the alkylated group is preferred. These crosslinking agents are generally partially alkylated melamine formaldehyde compounds and can be monomeric or polymeric and if polymeric have a degree of polymerization of about 1 to 3. Typical alcohols used to alkylate these resins are methanol, ethanol, propanol, butanol, isobutanol, and the like.

Coating compositions containing a melamine crosslinking agent can contain about 0.1 to 1.0%, based on the weight of a binder, of a strong acid catalyst or a salt thereof to lower curing temperatures and time. Para-toluene sulfonic acid is a preferred catalyst or its ammonium salt. Other catalysts that can be used are dodecyl benzene sulfonic acid, phosphoric acid and amine or ammonium salts of these acids. If the binder is used in a formulation that is cured with a polyisocyanate, a polyisocyanate is added to the binder system prior to application. The overall mixture is not stable in this case and should be used within a certain time period.

Typically, a cure-promoting catalyst is utilized in conjunction with the isocyanate crosslinking or curing agent. Preferred catalysts are organometallics, suitably dibutyl tin dilaurate, dibutyl tin di-2-ethylhexoate, zinc octoate, zinc napthenate, vanadium acetyl acetonate, or zirconium acetyl acetonate, in an effective curing amount. Such catalysts are optional, for example, elevated temperature and/or time can suffice to cure the composition.

Typical isocyanate crosslinking agents which can be used for curing the composition include compounds and polymers, blocked or unblocked. Examples of suitable polyisocyanates include monomeric polyisocyanates such as hexamethylene diisocyanate, toluene diisocyanate and 4,4'-methylene-bis(cyclohexylisocyanate), isophorone diisocyanate and the NCO-functional oligomers such as the reaction products of monomeric polyisocyanate such as those mentioned above with a polyol precursor. Particularly useful isocyanates are the cyclotrimer of isophorone diisocyanate and the biuret-form 1,6-hexamethylene diisocyanate commercially available from Bayer as Desmodur® N and the cyclotrimer of hexamethylene diisocyanate, and the like. Other crosslinking agents include 4,4'-biphenylene diisocyanate, tetra-methyl diisocyanate, ethylethylene diisocyanate, 1,3 cyclopentylene diisocyanate, 1,3-phenylene diisocyanate, 1,5-naphtalene diisocyanate, tetramethyl xylylene diisocyanate (TMXDI-Cytec), bis(4-isocyanatocyclohexyl)methane, and the like. Trifunctional isocyanates can be used, for example, triphenylmethane triisocyanate, 1,3,5-benzene triisocyanate, 2,4,6-toluene triisocyanate, an adduct of trimethylol and tretramethyl xylene diisocyanate sold under the tradename Cythane® 3160, Desmodur® N 3390 which is the trimer of hexamethylene diisocyanate (preferred), and the like. Optionally, one can use a polyisocyanate acrylic copolymer derived from isocyanato-ethyl methacrylate. Examples of suitable blocking agents are those material which would unblock at elevated temperatures, for example, lower aliphatic alcohols such as methanol, oximes such as methylethyl ketone oxime, and lactams such as epsiloncaprolactam. Blocked isocyanates can be used to form stable one-package systems. Polyfunctional isocyanates with free isocyanate groups can be used to form two-package room temperature-curable systems. In these systems, the product and isocyanate curing agent are mixed just prior to their application.

The following Examples illustrate the invention. All parts and percentages are on a weight basis unless otherwise indicated. All molecular weights are weight average determined by gel permeation chromatograph (GPC) on polystyrene standards.

EXAMPLES

Examples 1 to 3

These Examples illustrate the use of tertiary acid glycidyl esters to prepare hydroxy functional polyester derivatives: the polycarboxylic acid derivatives and the reaction solvent (Mixture 1-Table 1) are charged in a reaction vessel under nitrogen and Table 1) are charged in a reaction vessel under nitrogen and heated at reflux while stirring (±140°–160° C.). Mixture 2 was added to the reactor over 15 minutes. Afterwards, Mixture 3 was added for rinsing. The reaction mixture was stirred at reflux until the acid number was lower or equal to 4 (mg KOH/g solids).

Examples 4 to 7

The polycarboxylic acid compounds used to prepare the described polyester polyols, can also be prepared by condensing a polyol and acid anhydride as illustrated in Table 2. Polyol, acid anhydride and solvent (reaction mixture) are charged to the reactor under nitrogen and heated to reflux while stirring at about 140° C. The reaction mixture is mixed at reflux until the theoretical acid number is reached.

Examples 8 to 11

The above-described poly-carboxylic acid compounds (Examples 4 to 7) can be used to prepare hydroxy-functional polyester oligomers. Table 3 illustrates the synthesis of these types of oligomers. The same reaction procedure is followed as described in Examples 1 to 3.

TABLE 1

|  | EXAMPLE 1 | EXAMPLE 2 | EXAMPLE 3 |
|---|---|---|---|
| Mixture 1 | | | |
| 1,4-cyclohexane dicarboxylic acid (CHDA) | 26.81 | — | — |
| isophthalic acid | — | 23.13 | — |
| tertiary butyl isophthalic acid | — | — | 27.75 |
| butyl acetate | 9 | — | — |
| propylene glycol methyl ether acetate | — | 14.99 | 14.99 |
| dimethyl cyclohexylarnine | — | 0.01 | 0.01 |
| Mixture 2 14.99 | | | |
| pivalic acid glycidyl ester | 50.19 | 44.87 | 40.25 |
| butyl acetate | 1 | 1 | 1 |
| Mixture 3 | | | |
| butyl acetate | 1 | 1 | 1 |
| Final Thinning | | | |
| butyl acetate | 12 | 15 | 15 |
| TOTAL | 100 | 100 | 100 |
| TEST RESULTS | | | |
| Solids | 77.2% | 67.8% | 68.6% |
| Viscosity (Gardner Holdt) | C − ¼ | A + ½ | B + ½ |
| Acid value | 1.6 | 3.6 | 4.3 |
| Molecular weight (weight average) | 460 | 760 | 800 |
| OH (theoretical)* | 227 | 230 | 206 |

*hydroxyl number (mg KOH/g solids)

TABLE 2

|  | EXAMPLE 4 | EXAMPLE 5 | EXAMPLE 6 | EXAMPLE 7 |
|---|---|---|---|---|
| Reaction mixture | | | | |
| mono pentaerythritol | 9.69 | 7.79 | — | 4.91 |
| MHHPA (methylhexahydro-phthalic anhydride) | 35.9 | — | — | — |
| HHPA (hexahydrophthalic anhydride) | — | 35.3 | — | — |
| trimethylolpropane | — | — | 6.4 | — |
| trimellitic anhydride | — | — | 27.49 | — |
| hydrogenated trimellitic anhydride | — | — | — | 28.59 |
| dibutyl tin dilaurate | — | — | 0.01 | 0.08 |
| butylacetate | 14 | 14 | 13.99 | 15.16 |
| Final thinning | | | | |
| butyl acetate | 1 | 1 | 1 | 1 |
| TOTAL | 60.59 | 58.09 | 48.89 | 49.74 |
| TEST RESULTS | | | | |
| Solids | 75% | 78.3% | — | — |
| Acid Number | 258 | 293 | — | — |
| Molecular weight (weight average) | 650 | 500 | — | — |

TABLE 3

|  | EXAMPLE 8 | EXAMPLE 9 | EXAMPLE 10 | EXAMPLE 11 |
|---|---|---|---|---|
| Mixture 1 | | | | |
| Polyacid Example 4 | 59.59 | — | — | — |
| Polyacid Example 5 | — | 58.09 | — | — |
| Polyacid Example 6 | — | — | 48.89 | — |
| Polyacid Example 7 | — | — | — | 49.74 |
| Mixture 2 | | | | |
| pivalic acid glycidyl ester | 34.41 | 36.91 | 46.11 | 46.5 |
| butyl acetate | 2 | 2 | 2 | 1 |
| Mixture 3 | | | | |
| butyl acetate | 1 | 1 | 1 | 1 |
| Final thinning | | | | |
| butyl acetate | 3 | 2 | 2 | 1.76 |
| TOTAL | 100 | 100 | 100 | 100 |
| TEST RESULTS | | | | |
| Solids | 80.4% | 80.1% | 81.4% | 80.1% |
| Viscosity (Gardner Holdt) | Z3 | Z3 − ¼ | Z5 + ¼ | Z5 |
| Acid number | 0.8 | 0.1 | 0.5 | 4 |
| Molecular weight (weight average) | 1200 | 1200 | 2600 | 2800 |
| Molecular weight (number average) | 950 | 850 | 1000 | 1900 |
| OH (theoretical) | 200 | 160 | 200 | 202 |

Examples 12 to 14

The hydroxy-functional polyester is prepared by reaction of a poly-glycidyl ester derivative with a tertiary acid compound. The poly-glycidyl ester derivative, the tertiary acid compound and the reaction solvent (Mixture 1—Table 4) are charged in the reaction vessel under nitrogen and heated at 120° C. while stirring. The batch is allowed to exotherm to 140° C. and further held at 140°–160° C. until the acid number is lower or equal to 1 (mg KOH/g solids). The resin solution is then further diluted.

TABLE 4

|  | EXAMPLE 12 | EXAMPLE 13 | EXAMPLE 14 |
|---|---|---|---|
| Mixture 1 | | | |
| Araldite ® PY284 (Ciba Geigy) | 43.91 | — | — |
| TMP/MHHPA/GLYCIDYL ESTER (*) | — | 69.17 | 67.46 |
| dimethylol propionic acid | 36.09 | — | 8.32 |
| pivalic acid | — | 19.47 | 12.66 |
| butyl acetate | 15 | 7.64 | 9.31 |
| Final thinning | | | |
| butyl acetate | 5 | 3.72 | 2.25 |
| TOTAL | 100 | 100 | 100 |
| TEST RESULTS | | | |
| Solids | 80.4% | 81.5% | 80.2% |
| Acid number | 0.7 | 0.14 | 0.2 |
| Viscosity (Gardner Holdt) | >Z6 | Z1 + ½ | Z4 + ½ |
| Molecular weight (weight average) | 900 | 1300 | 1400 |
| Molecular weight (number average) | 600 | 900 | 1000 |
| OH (theoretical) | 567 | 134 | 218 |

(*) 87.5% solution in butyl acetate of the 3-functional glycidyl ester of the TMP/MHHPA (1/3 molar) adduct (epoxy equivalent weight on solids: 317)

Example 15

A clearcoat was formulated by blending the following components: mar and slip silicones, UV-protection additives, accelerator catalyst, and organic solvents common to the art.

Isocyanate resin: polyisocyanate cyclotrimer, DesN3390 from Bayer
added to a molar ratio OH/NCO=1

| Components | oligomer (Ex. 8) | 42.50 |
|---|---|---|
| | additives | 2.02 |
| | organic solvents | 29.38 |
| | isocyanate resin | 26.10 |
| | | 100.00 |

The physical drying properties are tested in 2 different ways. For dust-free time, the paint is spray-applied on top of a standard primer at a dry film thickness of 2.5 to 3 mils. At appropriate time intervals, the surface is touched slightly by cotton fibers. The paint is considered dust-free if no cotton fibers are retained anymore at the paint surface. For tack-free time, the paint is spray-applied on top of a standard primer at a dry-film thickness of 2.5 to 3 mils and baked for 30 minutes at 60° C. At appropriate time intervals, a paper is put on the surface of the paint. On top of the paper, a standard weight of 50 g is placed. After 10 seconds, the weight is removed and the panel is turned upside down. If the paper falls within 10 seconds, the paint is considered tack-free.

The results are as follows:

Dust-free time: 60 minutes

Tack-free time after bake: immediately

For hardness-testing, the paint is sprayed on glass (60 microns) and baked for 30 minutes at 60° C. The hardness of the paint film is then tested, using a pendulum hardness tester: the oscillations of a pendulum are dampened to a greater degree, the "softer" the coating is. The time in seconds, in which the amplitude of a pendulum swing decreases from an initial value to a set value, is a measure of the degree of dampening.

Specifically, this test measures the time for the pendulum swing to be reduced from 12° to 4° when in contact with the test specimen. This test is based on the international organization for Standardization (ISO). The instrument used is a pendulum hardness tester NFT30-016 with automatic counter.

The test results are as follows:

Persoz hardness
immediately after bake: 58

1 week after bake: 319.

What is claimed is:

1. A composition comprising a polyester polyol having a weight average molecular weight of 400 to 4000 and a hydroxy number of 100 to 400 containing at least 20% by weight of at least one of the following tertiary acid ester end groups:

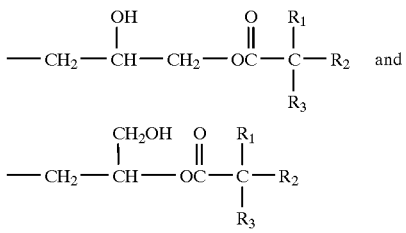

wherein $R_1$, $R_2$, $R_3$ are independently selected from $CH_3$ and $CH_2OH$, and wherein said polyester polyol is produced from a polycarboxylic acid having an acid value of 100 to 800.

2. The composition of claim 1 wherein the tertiary acid end groups are derived from a tertiary acid selected from the group consisting of pivalic acid, dimethylol propionic acid and hydroxy pivalic acid.

3. The composition of claim 1 wherein the acid value of said polycarboxylic acid is 250 to 700.

4. A process for preparing a composition according to claim 1 comprising reacting A (i) and A (ii) or B (i) and B (ii) or a mixture thereof as follows:

(A) (i) 10% to 80%, by weight of the binder, of a polycarboxylic acid or a mixture of polycarboxylic acids, having a weight average molecular weight of 100 to 1500, and an acid value of 100 to 800 (mg KOH/g solid; and
(ii) 90% to 20%, by weight of the binder, of a tertiary acid glycidyl ester;

(B) (i) 20% to 80%, by weight of the binder, of a poly-glycidyl ester derivative reaction product of polycarboxylic acid with epichlorohydrin, having a weight average molecular weight of about 200 to 2000 and an epoxy equivalent weight of 100 to 400; and
(ii) 80% to 20%, based on weight of the binder, of a tertiary acid derivative, selected from the group pivalic acid, dimethylolpropionic acid and hydroxy pivalic acid.

* * * * *